United States Patent
Kamiya

(10) Patent No.: US 8,573,646 B2
(45) Date of Patent: Nov. 5, 2013

(54) MOUNTING STRUCTURE FOR NOX REDUCTION DEVICE FOR CONSTRUCTION MACHINE

(75) Inventor: Shohei Kamiya, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 396 days.

(21) Appl. No.: 12/866,188

(22) PCT Filed: Feb. 4, 2009

(86) PCT No.: PCT/JP2009/051892
§ 371 (c)(1),
(2), (4) Date: Aug. 4, 2010

(87) PCT Pub. No.: WO2009/099104
PCT Pub. Date: Aug. 13, 2009

(65) Prior Publication Data
US 2011/0005853 A1    Jan. 13, 2011

(30) Foreign Application Priority Data
Feb. 7, 2008   (JP) .................................. 2008-027754

(51) Int. Cl.
*B60K 13/04* (2006.01)

(52) U.S. Cl.
USPC ........................... 280/759; 414/719; 180/89.2

(58) Field of Classification Search
USPC .......... 280/755, 759; 414/601, 602, 673, 719; 172/611
See application file for complete search history.

(56) References Cited

U.S. PATENT DOCUMENTS 5,816,351 A * 10/1998 Akira et al. .................. 180/68.1
6,296,436 B1 * 10/2001 Ramun ......................... 414/719

(Continued)

FOREIGN PATENT DOCUMENTS

| JP | 2003-41627 A | 2/2003 |
| JP | 2004-218570 A | 8/2004 |
| JP | 2005-155404 A | 6/2005 |
| JP | 2007-138872 A | 6/2007 |
| JP | 2008-156835 A | 7/2008 |

OTHER PUBLICATIONS

International Search Report dated Apr. 14, 2009 with English translation (four (4) pages).
Chinese-language Office Action dated Nov. 26, 2012 (Eight (8) pages).
Japanese Office Action dated Jun. 26, 2012 (seven (7) pages).

*Primary Examiner* — John Walters
*Assistant Examiner* — Brian Swenson
(74) *Attorney, Agent, or Firm* — Crowell & Moring LLP

(57) ABSTRACT

A mounting structure is provided for an NOx reduction system for a hydraulic excavator. The NOx reduction system includes a PM collection filter to be arranged in an exhaust passage of an engine to collect suspended particulate matter in exhaust gas from the engine, a urea SCR catalyst for reducing and purifying nitrogen oxides in the exhaust gas from the engine, a urea water spay device for spraying a urea water into the exhaust passage of the engine, a urea water feeder for feeding the urea water to the urea water spray device, and a urea water storage tank for storing therein the urea water to be guided to the urea water feeder. In the mounting structure, the counterweight is provided with a recessed section formed therein, the urea SCR catalyst is arranged in the recessed section, and the PM collection filter is arranged in the engine compartment. The urea SCR catalyst and PM collection filter are arranged to form an "L" pattern.

4 Claims, 6 Drawing Sheets

(56) References Cited

U.S. PATENT DOCUMENTS

| | | |
|---|---|---|
| 7,147,250 B2 * | 12/2006 | Kubo et al. .................. 280/755 |
| 7,264,785 B2 * | 9/2007 | Blakeman et al. ......... 423/213.2 |
| 7,740,809 B2 * | 6/2010 | Suwabe et al. ................ 422/180 |
| 7,763,222 B2 * | 7/2010 | Miyairi et al. ............. 423/239.1 |
| 7,810,597 B2 * | 10/2010 | Imashige .................... 180/69.2 |
| 7,967,094 B2 * | 6/2011 | Matsushita et al. .......... 180/69.2 |
| 2003/0056404 A1 * | 3/2003 | Iwasa et al. ..................... 37/347 |
| 2006/0042871 A1 * | 3/2006 | Yasuda et al. ................ 181/227 |

* cited by examiner

MOUNTING STRUCTURE FOR NOX REDUCTION DEVICE FOR CONSTRUCTION MACHINE

TECHNICAL FIELD

This invention relates to a mounting structure for an NOx reduction system, which is to be arranged on a construction machine such as a hydraulic excavator and includes, as components, a PM collection filter for collecting suspended particulate mater contained in exhaust gas from an engine and a reduction catalyst for reducing and purifying nitrogen oxides (NOx) in the exhaust gas from the engine.

BACKGROUND ART

As a conventional technology of this sort, there is one disclosed in Patent Document 1. Disclosed in this Patent Document 1 are an NOx reduction system, which includes an upstream-side, first aftertreatment device for collecting particulates contained as suspended particulate matter in exhaust gas from an engine, that is, a PM collection filter and also a downstream-side, second aftertreatment device for purifying and detoxifying nitrogen oxide (NOx), that is, a reduction catalyst, and also a construction that the PM collection filter and the reduction catalyst are arranged in a turned square "U" pattern via a piping which forms an exhaust passage of the engine.

Mounting of such an NOx reduction system is also desired in a construction machine. The above-mentioned conventional technology disclosed in the Patent Document 1 will hereinafter be described with respect to a mounting structure for the NOx reduction system, which can be contemplated upon mounting the NOx reduction system on a construction machine, for example, a hydraulic excavator.

FIG. 5 is a plan view showing certain essential parts of the conventionally-contemplated mounting structure for the NOx reduction system for the construction machine, and FIG. 6 is a view as seen in the direction of arrow B in FIG. 5.

As shown in these FIGS. 5 and 6, the hydraulic excavator is provided with a revolving upperstructure 40 mounted on a travel base. This revolving upperstructure 40 is provided with an engine compartment 41 and a counterweight 42 arranged adjacent the engine compartment 41 at a rear position of a body to maintain stability of the body. An engine 43 and a hydraulic pump 44 drivable by the engine 43 are arranged in the engine compartment 41. Upon application of the above-mentioned conventional technology disclosed in the Patent Document 1 to such a hydraulic excavator, it may be possible to contemplate a construction that as shown in FIG. 5, a PM collection filter 46 and a reduction catalyst 48 are arranged side by side in a lateral direction of the construction machine such that the reduction catalyst 48 is located on an outboard side, the engine 43 is communicated to the PM collection filter 46 via a piping 45, the PM collection filter 46 is communicated to the reduction catalyst 48 via a piping 47, and a muffler 49 is arranged at a part of the reduction catalyst 48 to release exhaust gas into the atmosphere. Specifically, it may be possible to contemplate a construction that the PM collection filter 46 and the reduction catalyst 48 are arranged via the piping 47 in a turned square "U" pattern as seen in plan.

Patent Document 1: JP-A-2005-155404

DISCLOSURE OF THE INVENTION

Problem to Be Solved by the Invention

However, a problem such as that to be described below arises if an attempt is made to apply the conventional technology disclosed in Patent Document 1 to a construction machine such as a hydraulic excavator as shown in FIGS. 5 and 6.

As the reduction catalyst 48 and hydraulic pump 44 are arranged close to each other, a surrounding space of the hydraulic pump 44, in other words, a working space needed upon conducting maintenance of the hydraulic pump 44 becomes narrower, leading to a problem that the practice of maintenance of the hydraulic pump 44 is rendered difficult. In addition, a hydraulic hose connected to the hydraulic pump 44 is located in a proximity of the reduction catalyst 48, which produces high reaction heat through a chemical reaction and also serves as a heat source. There is, accordingly, a potential danger that, if the hydraulic hose bursts, oil which is flowing through the hydraulic hose may come into contact with the reduction catalyst 48 as the heat source to cause a fire. It is to be noted that, in the case of a construction machine the width of which is restricted as in an ultra-small excavator having a small width, no sufficient space may be assured to be left open for arranging the PM collection filter 46 and reduction catalyst 48 side by side in the lateral direction of the construction machine. On a construction machine the width of which is small as described above, the NOx reduction system disclosed in Patent Document 1 may not be mounted accordingly.

With the foregoing current circumstances in view, the present invention has as an object thereof the provision of a mounting structure for an NOx reduction system for a construction machine, which can assure to leave the surrounding space of a hydraulic pump wide open, can isolate a reduction catalyst, which also serves as a heat source, and a hydraulic hose connected to the hydraulic pump from each other, and can be applied even to a small-width construction machine.

Means for Solving the Problem

To achieve this object, a mounting structure according to the present invention for an NOx reduction system for a construction machine is characterized in that, in the mounting structure for the NOx reduction which is to be arranged on the construction machine having an engine compartment, a counterweight arranged adjacent the engine compartment at a rear position of a body to maintain stability of the body, an engine and a hydraulic pump drivable by the engine, said engine and hydraulic pump being arranged in the engine compartment, said NOx reduction system including a PM collection filter to be arranged in an exhaust passage of the engine to collect suspended particulate matter contained in exhaust gas from the engine, a reduction catalyst for reducing and purifying nitrogen oxides contained in the exhaust gas from the engine, a reducing agent spay device for spraying a reducing agent into the exhaust passage of the engine, a reducing agent feeder for feeding the reducing agent to the reducing agent spray device, and a reducing agent storage tank for storing therein the reducing agent to be guided to the reducing agent feeder, the counterweight is provided with a recessed section formed therein, the reduction catalyst is arranged in the recessed section, and the PM collection filter is arranged in the engine compartment.

In the present invention constructed as described above, the reduction catalyst is arranged in the recessed section of the counterweight, and the PM collection filter is arranged in the engine compartment. Only the PM collection filter out of the PM collection filter and reduction catalyst is, therefore, arranged around the hydraulic pump. As a consequence, it is possible to leave wide open the surrounding space of the hydraulic pump, in other words, the working space needed upon conducting maintenance of the hydraulic pump.

Owing to the arrangement of the reduction catalyst in the recessed section of the counterweight, said recessed section being remote from the hydraulic pump in the engine compartment, the reduction catalyst, which also serves as a heat source, and the hydraulic hose connected to the hydraulic pump can be isolated from each other. As a consequence, even if the hydraulic hose bursts and the oil in the hydraulic hose leaks out, the oil can be prevented from coming into contact with the reduction catalyst, thereby making it possible to prevent a fire by such oil leaked out of the hydraulic hose as described above.

As the reduction catalyst is arranged in the recessed section of the counterweight, it is only the PM collection filter out of the PM collection filter and reduction catalyst that is arranged in the lateral direction. Even if restrictions are imposed by the machine width, it is easy to assure to leave open an installation space for the PM collection filter. The mounting structure according to the present invention can, therefore, be applied even to a construction machine the width of which is small.

The mounting structure according to the present invention for the NOx reduction system for the construction machine may also be characterized in that in the above-described invention, the construction machine is further provided with a fan for producing wind to cool a heat exchanger, and the reducing agent storage tank and reducing agent feeder are arranged in the recessed section of the counterweight.

In the present invention constructed as described above, the reducing agent storage tank and reducing agent feeder can be arranged in the same recessed section of the counterweight, and can be positioned in a proximity of the reduction catalyst which also serves as a heat source. Even if the construction machine is placed in an environment of extremely low temperature, it is, therefore, possible to thaw the reducing agent in the reducing agent storage tank and the reducing agent in the reducing agent feeder at an early stage so that the purification of exhaust gas can be initiated at an early stage.

When the reduction catalyst is arranged such that it is located on a downstream side relative to the fan and the reducing agent storage tank and reducing agent feeder are arranged on a downstream side of the reduction catalyst, wind produced by the fan is heated by the reduction catalyst, and the heated wind is applied to the reducing agent storage tank and reducing agent feeder. It is, therefore, possible to heat the reducing agent in the reducing agent storage tank and the reducing agent in the reducing agent feeder by the above-mentioned heated wind and to further promote the thawing of the reducing agent after a start-up of the engine.

The mounting structure according to the present invention for the NOx reduction system for the construction machine may also be characterized in that in the above-described invention, the mounting structure is further provided with a piping forming the exhaust passage of the engine and communicating the engine to the PM collection filter and another piping communicating the PM collection filter to the reduction catalyst, and these pipings are provided with vibration-damping sleeves, respectively.

In the present invention constructed as described above, the piping, which communicates the engine to the PM collection filter, and the piping, which communicates the PM collection filter to the reduction catalyst, can be maintained by the vibration-damping sleeves without being affected by vibrations or the like when vibrations or the like occur on the construction machine as a result of work. As a consequence, the NOx reduction system can be maintained in a stable state against vibrations or the like.

The mounting structure according to the present invention for the NOx reduction system for the construction machine may also be characterized in that in the above-described invention, the mounting structure is further provided with an anchor plate for fixing the PM collection filter in place, a bracket for supporting the anchor plate, and a vibration-damping member interposed between the anchor plate and the bracket.

In the present invention constructed as described above, the PM collection filter can be maintained in a stable state without being affected by vibrations or the like by the vibration-damping member when vibrations or the like occur on the construction machine.

Advantageous Effects of the Invention

In the present invention, the counterweight is provided with the recessed section formed therein, the reduction catalyst is arranged in the recessed section, and the PM collection filter is arranged in the engine compartment. It is, therefore, only the PM collection filter out of the PM collection filter and reduction catalyst that is arranged around the hydraulic pump disposed in the engine compartment. As a consequence, the surrounding space of the hydraulic pump can be assured to remain wide open, so that the maintenance of the hydraulic pump is facilitated. Therefore, excellent ease of maintenance is assured for the hydraulic pump.

The reduction catalyst as a heat source and the hydraulic hose connected to the hydraulic pump can be isolated from each other. As a consequence, even if the hydraulic hose bursts and the oil in the hydraulic hose leaks out, it is possible to prevent a fire by the leaked oil, thereby making it possible to assure excellent safety.

In the engine compartment, it is necessary to arrange only the PM collection filter out of the PM collection filter and reduction catalyst. Therefore, the mounting structure according to the present invention can be applied even to a construction machine the width of which is small, and can be assured to have excellent versatility.

BEST MODE FOR CARRYING OUT THE INVENTION

Based on drawings, a description will hereinafter be made of a best mode for carrying out the mounting structure according to the present invention for the NOx reduction system for the construction machine.

Figure 1:
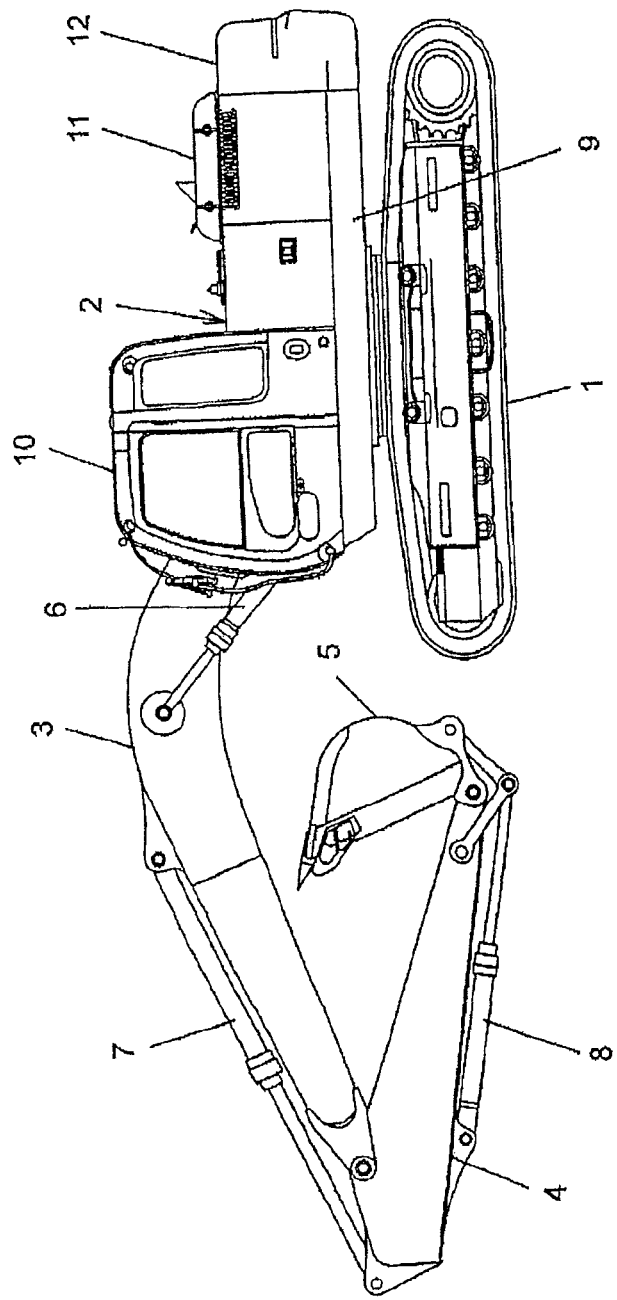
FIG. 1 is a side view showing a hydraulic excavator taken as one example of a construction machine on which an embodiment of the mounting structure according to the present invention for the NOx reduction system can be arranged.
Figure 2:
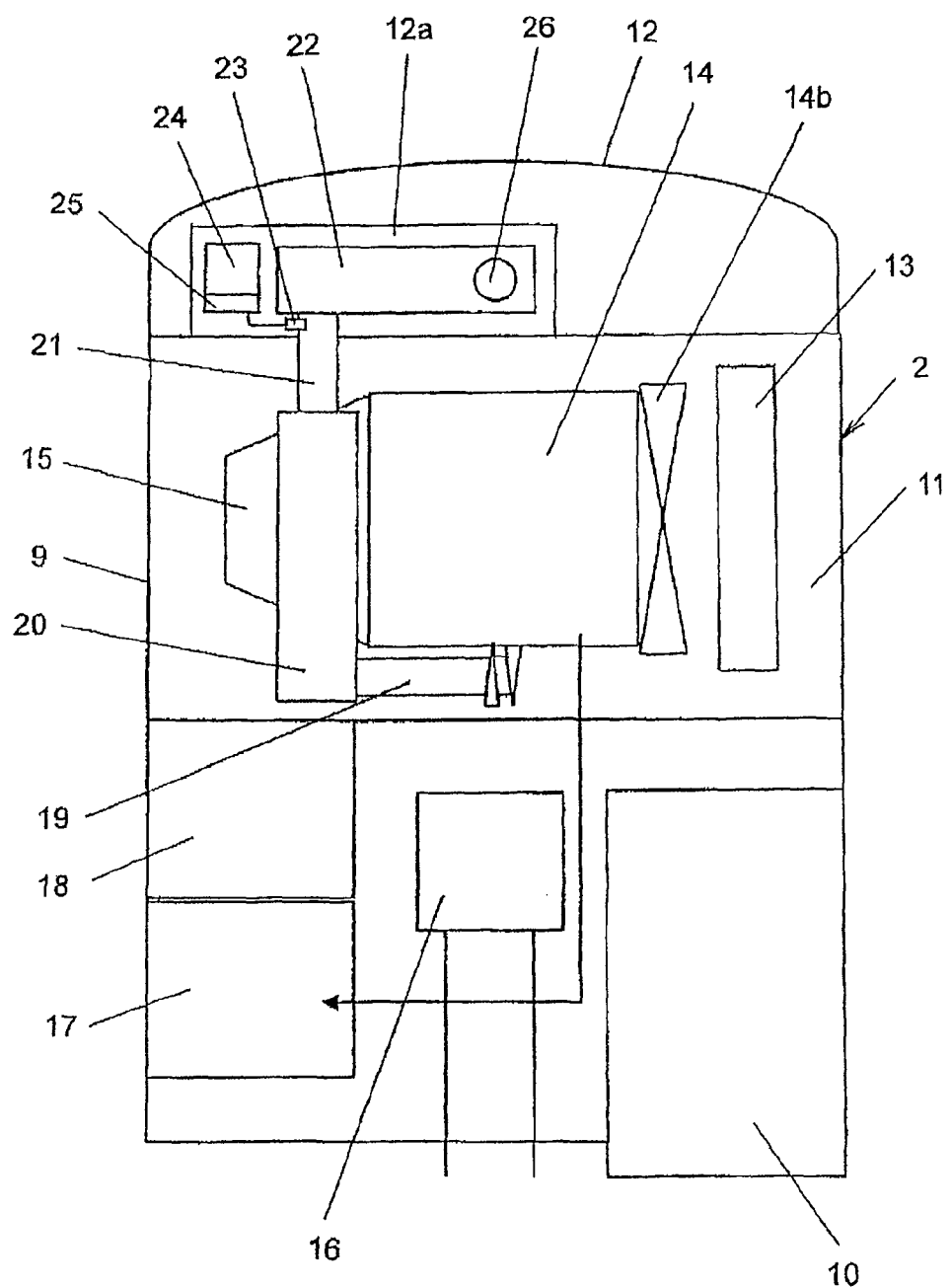
FIG. 2 is a plan view illustrating the outline construction of a revolving upperstructure arranged in the hydraulic excavator shown in FIG. 1.
Figure 3:
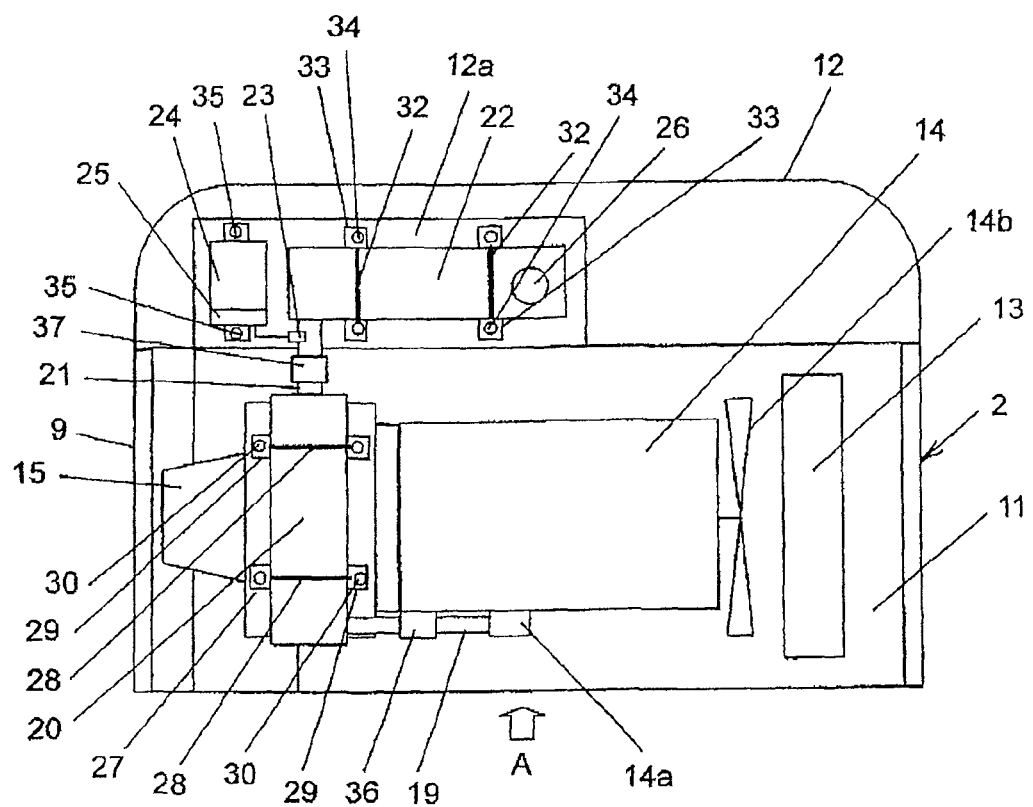
FIG. 3 is a plan view illustrating a mounting structure according to this embodiment for the NOx reduction system, which is arranged in the revolving upperstructure shown in FIG. 2.
Figure 4:
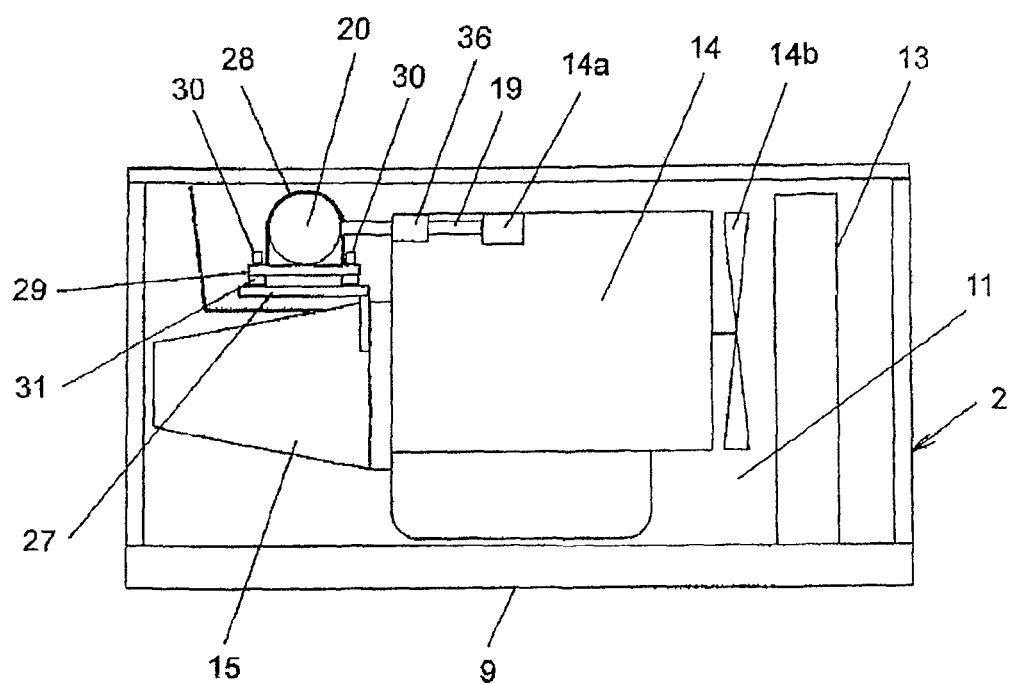
FIG. 4 is a view as seen in the direction of arrow "A" in FIG. 3.
Figure 5:
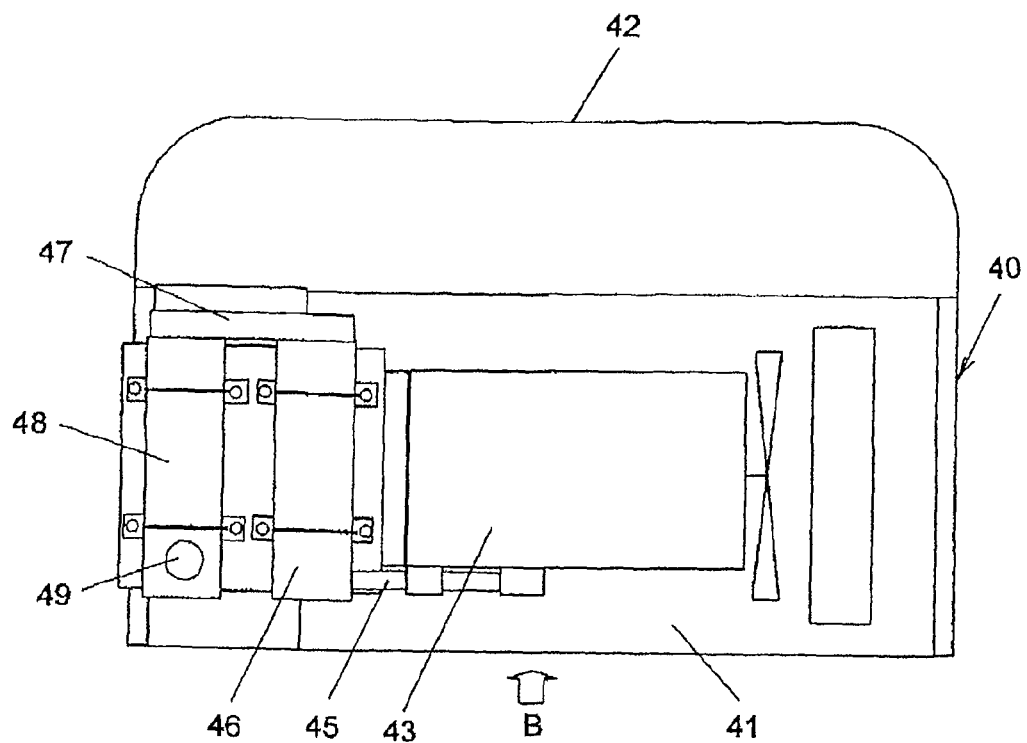
FIG. 5 is a plan view showing certain essential parts of a conventionally-contemplated mounting structure for an NOx reduction system for a construction machine.
Figure 6:
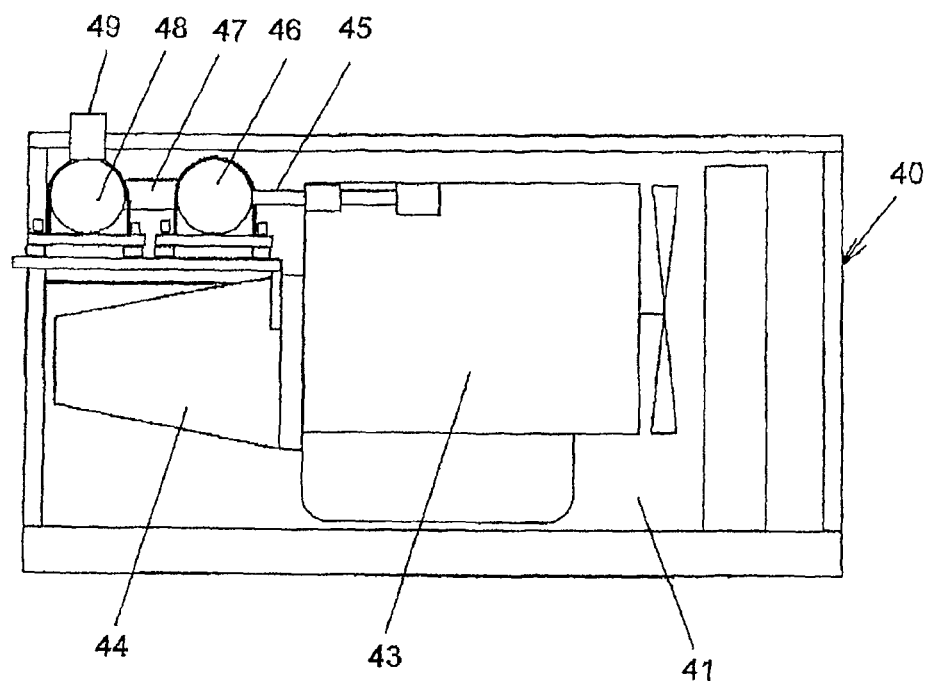
FIG. 6 is a view as seen in the direction of arrow "B" in FIG. 5.

FIG. 1 is a side view showing a hydraulic excavator taken as one example of a construction machine on which an embodiment of the mounting structure according to the present invention for the NOx reduction system can be arranged; FIG. 2 is a plan view illustrating the outline construction of a revolving upperstructure arranged in the hydraulic excavator shown in FIG. 1; FIG. 3 is a plan view illustrating the mounting structure according to this embodiment for the NOx reduction system, which is arranged in the revolving upperstructure shown in FIG. 2; and FIG. 4 is a view as seen in the direction of arrow "A" in FIG. 3.

The construction machine to which the mounting structure of this embodiment for the NOx reduction system can be applied is, for example, the hydraulic excavator shown in FIG. 1, and this hydraulic excavator is equipped with a travel base 1 and a revolving upperstructure 2 mounted on the travel base 1. The hydraulic excavator is also provided with a boom 3 pivotally attached in an up-and-down direction to the revolving upperstructure 2, an arm 4 pivotally attached in an up-and-down direction to a forward end of the boom 3, and a bucket 5 pivotally attached in an up-and-down direction to a forward end of the arm 4 such that it can be used in digging work or the like. These boom 3, arm 4 and bucket 5 make up a front working mechanism.

Also provided are a boom cylinder 6 for driving the boom 3, an arm cylinder 7 for driving the arm 4 and a bucket cylinder 8 for driving the bucket 5, and in addition, an unillustrated travel motor for causing the travel base 1 to travel, an unillustrated swing motor for causing the revolving upperstructure 2 to swing, and the like. A hydraulic actuator is constituted by these boom cylinder 6, arm cylinder 7 and bucket cylinder 8, the unillustrated travel motor and swing motor, and the like.

On a body frame 9 arranged in the revolving upperstructure 2, an operator's cab 10 is arranged at a front-side position, and a counterweight 12 for securing a weight balance to maintain stability of the body is arranged at a rear-side position. On a front-side part located adjacent the counterweight 12, an engine compartment 11 is arranged. In the counterweight 12, a recessed section 12a is formed, for example, such that the recessed section 12 extends through a lower part of the counterweight 12 and extends to the body frame 9.

As shown in FIG. 2, arranged in the engine compartment 11 are an engine 14, a fan 14b drivable by the engine 14 to produce wind that cools engine coolant or the like flowing through a heat exchanger 13, and a hydraulic pump 15 drivable by the engine 14 to feed pressure oil to the above-mentioned hydraulic actuator. In a vicinity of the operator's cab 10 located outside the engine compartment 11, a hydraulic pressure control valve unit 16 is arranged to control a flow of pressure oil to be fed from the hydraulic pump 15 to the above-mentioned hydraulic actuator. It is to be noted that as shown in FIG. 3, the engine 14 is equipped with a turbocharger 14a.

As also shown in FIG. 2, arranged at a position in a neighborhood of the hydraulic pressure control valve unit 16 located outside the engine compartment 11 are a fuel tank 17 for storing fuel to be fed to the engine 14 and a hydraulic oil tank 18 for storing hydraulic oil to be drawn into the hydraulic pump 15. These fuel tank 17 and hydraulic oil tank 18 are mounted on the body frame 9.

As shown in FIGS. 3 and 4, the NOx reduction system in this embodiment, said system being to be arranged on the hydraulic excavator having such a construction as described above, includes a PM collection filter 20 arranged in an exhaust passage of the engine 14 to collect suspended particulate matter contained in exhaust gas from the engine 14, a reduction catalyst for reducing and purifying nitrogen oxides contained in the exhaust gas from the engine 4, for example, a urea SCR catalyst 22, a reducing agent spray device for spraying a reducing agent, for example, a urea water into the exhaust passage of the engine 14, specifically a urea water spray device 23, a reducing agent feeder for feeding the urea water to the urea water spray device 23, specifically a urea water feeder 25, and a reducing agent storage tank for storing the urea water to be guided to the urea water feeder 25, specifically a urea water tank 24.

The engine 14 is communicated to the PM collection filter 20 via a piping 19, and the PM collection filter 20 is communicated via a piping 21 to the urea SCR catalyst 22 located downstream of the PM collection filter 20. Namely, these pipings 19,21 make up the exhaust passage of the engine 14. To the urea SCR catalyst 22, a muffler 26 is connected to release exhaust gas into the atmosphere.

Among the components of the NOx reduction system in the above-described embodiment, the PM collection filter 20 is arranged in the engine compartment 11 located above the hydraulic pump 15. This PM collection filter 20 is held in place as shown in FIGS. 3 and 4. Described specifically, there is arranged a bracket 27 fixed, for example, on the engine 14, and on this bracket 27, anchor plates 29 are arranged via vibration-damping members 31 made, for example, from an elastomer. Fastening bands 28 that fasten the PM collection filter 20 are arranged integrally with the anchor plates 29, respectively. The anchor plates 29 are fixed and supported together with the vibration-damping members 31 on the bracket 27 by bolts 29, respectively.

Among the components of the NOx reduction system in the above-described embodiment, the urea SCR catalyst 22, urea water feeder 25, urea water tank 24 and urea water spray device 23 are arranged in the recessed section 12a of the counterweight 12 such that their top walls do not extend out beyond a top wall of a counterweight 12. The structure formed of the above-mentioned PM collection filter 20 and urea SCR catalyst 22 and the piping 21 communicating the PM collection filter 20 to the urea SCR catalyst 22 is formed, for example, in an "L" pattern.

The urea SCR catalyst 22 is arranged, for example, on a downstream side of the fan 14b, and the urea water feeder 25 and urea water tank 24 are arranged, for example, on a downstream side of the urea SCR catalyst 22. Further, the urea water spray device 23 is arranged such that the urea water can be sprayed into the piping 21 which communicates the PM collection filter 20 to the urea SCR catalyst 22.

The above-mentioned urea SCR catalyst 22 is fastened down by fastening bands 32 arranged integrally with anchor plates 33, respectively. The anchor plates 33 are fixedly secured on the body frame 9 by bolts 34 which extend through the lower part of the counterweight 12, said lower part being located underneath the recessed section 12a.

The piping 19 which communicates the engine 14 to the PM collection filter 20 is provided with a vibration-damping sleeve 36, while the piping which communicates the PM collection filter 20 to the urea SCR catalyst 22 is provided with another vibration-damping sleeve 37.

In the NOx reduction system constructed as described above and arranged by the mounting structure according to this embodiment, the urea water stored in the urea water tank 24 shown in FIG. 3 is guided to the urea water feeder 25, and from the urea water feeder 25, the urea water is fed to the urea water spray device 23. Suspended particulate matter in exhaust gas discharged into the piping 19, which makes up the exhaust passage of the engine 14, is collected by the PM collection filter 20, and NOx in the exhaust gas discharged into the piping 21 is reduced and purified by the urea water sprayed from the urea water spray device 23 into the piping 21 and the urea SCR catalyst 22 to which the piping 21 is communicated. The exhaust gas reduced in suspended particulate matter and NOx as described above is released into the atmosphere through the muffler 26.

According to the mounting structure of this embodiment for the NOx reduction system, the urea SCR catalyst 22 is arranged in the recessed section 12a formed in the counterweight 12, and the PM collection filter 20 is arranged in the engine compartment 11. Only the PM collection filter 20 out of the PM collection filter 20 and urea SCR catalyst 22 is, therefore, arranged around the hydraulic pump 15. As a consequence, the surrounding space of the hydraulic pump 15, in other words, the working space needed upon conducting the maintenance of the hydraulic pump 15 can be assured to remain wide open. Therefore, excellent ease of maintenance is assured for the hydraulic pump 15.

Owing to the arrangement of the urea SCR catalyst 22 in the recessed section 12a of the counterweight 12, said recessed section 12a being remote from the hydraulic pump 15 in the engine compartment 11, the urea SCR catalyst 22, which also serves as a heat source, and the hydraulic hose connected to the hydraulic pump 15 can be isolated from each other. As a consequence, even if the hydraulic hose bursts and the oil in the hydraulic hose leaks out, the oil can be prevented from coming into contact with the urea SCR catalyst 22. Accordingly, it is possible to prevent a fire by the leakage of oil as a result of such a burst of the hydraulic hose, and to assure excellent safety.

As the urea SCR catalyst 22 is arranged in the recessed section 12a of the counterweight 12, it is only the PM collection filter 20 out of the PM collection filter 20 and urea SCR catalyst 22 that is arranged in the lateral direction. Even if restrictions are imposed by the machine width, it is easy to assure to leave open an installation space for the PM collection filter 20. Therefore, the mounting structure according to the present invention can be applied even to a construction machine the width of which is small, and can assure excellent versatility.

The urea water tank 24 and urea water feeder 25 can be positioned in the proximity of the urea SCR catalyst 22, which is arranged in the same recessed section 12a of the counterweight 12 and also serves as a heat source. Even if the hydraulic excavator is placed in an environment of extremely low temperature, it is, therefore, possible to thaw the urea water in the urea water tank 24 and the urea water in the urea water feeder 25 at an early stage so that the purification of exhaust gas can be initiated at an early stage.

As the urea SCR catalyst 22 is arranged on the downstream side relative to the fan 14b and the urea water tank 24 and urea water feeder 25 are arranged on the downstream side of the urea SCR catalyst 22, wind produced by the fan 14b is heated by the urea SCR catalyst 22, and the heated wind is applied to the urea water tank 24 and urea water feeder 25. It is, therefore, possible to heat the urea water in the urea water tank 24 and the urea water in the urea water feeder 25 by the above-mentioned heated wind and to further promote the thawing of the urea water after a start-up of the engine 14.

As the piping 19, which communicates the above-mentioned engine 14 to the PM collection filter 20, and the piping 21, which communicates the PM collection filter 20 to the urea SCR catalyst 22, are provided with vibration-damping sleeves 36,37, respectively, the piping 19, which communicates the engine 14 to the PM collection filter 20, and the piping 21, which communicates the PM collection filter 20 to the urea SCR catalyst 22, can be maintained without being affected by vibrations or the like by the vibration-damping sleeves 36,37 when vibrations or the like occur on the hydraulic excavator as a result of digging work, and the NOx reduction system can be maintained in a stable state. It is, therefore, possible to avoid damages to the NOx reduction system by vibrations or the like as a result of the above-mentioned digging work or the like and to provide the NOx reduction system with excellent durability.

Further, the PM collection filter 20 is fastened down by the fastening bands 28 arranged integrally with the anchor plates 29, respectively, and the anchor plates 29 are supported by bolts 30 on the brackets 27 via the vibration-damping members 31, respectively. When vibrations or the like occur as a result of digging work or the like as mentioned above, the PM collection filter 20 can be maintained in a stable state by the vibration-damping members 31 without being affected by the vibrations or the like, thereby contributing to the realization of an NOx reduction system of excellent durability.

LEGEND

2 Revolving upperstructure
9 Body frame
11 Engine compartment
12 Counterweight
12a Recessed section
13 Heat exchanger
14 Engine
14b Fan
15 Hydraulic pump
19 Piping
20 PM collection filter
21 Piping
22 Urea SCR catalyst (reduction catalyst)
23 Urea water spray device (reducing agent spray device)
24 Urea water tank (reducing agent storage tank)
25 Urea water feeder (reducing agent feeder)
26 Muffler
27 Bracket
28 Fastening band
29 Anchor plate
30 Bolt
31 Vibration-damping member
32 Fastening band
33 Anchor plate
34 Bolt
35 Bolt
36 Vibration-damping sleeve
37 Vibration-damping sleeve

The invention claimed is:

1. A mounting structure for an NOx reduction system for a construction machine having an engine compartment, a counterweight arranged adjacent the engine compartment at a rear position of a body to maintain stability of the body, an engine and a hydraulic pump drivable by the engine, said engine and hydraulic pump being arranged in the engine compartment, said NOx reduction system including a PM collection filter to be arranged in an exhaust passage of the engine to collect suspended particulate matter contained in exhaust gas from the engine, a reduction catalyst for reducing and purifying nitrogen oxides contained in the exhaust gas from the engine, a reducing agent spray device for spraying a reducing agent into the exhaust passage of the engine, a reducing agent feeder for feeding the reducing agent to the reducing agent spray device, and a reducing agent storage tank for storing therein the reducing agent to be guided to the reducing agent feeder, wherein:

a recessed section, of which a top side opens toward a top of the counterweight, is formed at a side of the engine compartment in an upper portion of the counterweight, the reduction catalyst is arranged in the recessed section, and the PM collection filter is arranged in the engine compartment so that the PM collection filter is communicated with the reduction catalyst via a piping.

2. The mounting structure according to claim 1, wherein:

the construction machine is further provided with a fan for producing wind to cool a heat exchanger, and the reducing agent storage tank and reducing agent feeder are arranged in the recessed section of the counterweight.

3. The mounting structure according to claim 1, wherein:

the mounting structure is further provided with the piping communicating the PM collection filter to the reduction catalyst and another piping forming the exhaust passage of the engine and communicating the engine to the PM collection filter, and the pipings are provided with vibration-damping sleeves, respectively.

4. The mounting structure according to claim 1, wherein:

the mounting structure is further provided with an anchor plate for fixing the PM collection filter in place, a bracket for supporting the anchor plate, and a vibration-damping member interposed between the anchor plate and the bracket.

* * * * *